United States Patent
Amano et al.

(10) Patent No.: US 9,684,738 B2
(45) Date of Patent: Jun. 20, 2017

(54) TEXT-BASED COMMAND GENERATION

(71) Applicant: International Business Machines Corporation, Armonk, NY (US)

(72) Inventors: Takehiko Amano, Kanagawa (JP); Kenya Ishimoto, Tokyo (JP); Harumi Itoh, Tokyo (JP); Daisuke Maruyama, Kanagawa (JP); Atsushi Yokoi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 14/269,245

(22) Filed: May 5, 2014

(65) Prior Publication Data

US 2014/0351251 A1 Nov. 27, 2014

(30) Foreign Application Priority Data

May 23, 2013 (JP) .................... 2013-108686

(51) Int. Cl.
   *G06F 17/30* (2006.01)
   *G06F 9/44* (2006.01)
   *G06F 3/048* (2013.01)

(52) U.S. Cl.
   CPC ........ *G06F 17/30967* (2013.01); *G06F 3/048* (2013.01); *G06F 8/33* (2013.01); *G06F 8/34* (2013.01); *G06F 17/3066* (2013.01)

(58) Field of Classification Search
   CPC .... G06F 9/45512; G06F 17/50; G06F 3/0484; G06F 8/34; G06F 3/048; G06F 8/33; G06T 11/60
   See application file for complete search history.

(56) References Cited

U.S. PATENT DOCUMENTS 4,815,029 A * 3/1989 Barker ................ G06F 3/04842
                                                    700/83
5,450,600 A * 9/1995 Abe .................... G06F 9/45512
                                                    715/705
(Continued)

FOREIGN PATENT DOCUMENTS

JP          08115436 A      5/1996
JP          09504897 A      5/1997
(Continued)

OTHER PUBLICATIONS

"A Universal Sketch Input Method," [online], [Search: May 21, 2013] Internet URL:http://sagaweb.csse.muroran-it.ac.jp/skit_eng/ ; 1 page.

*Primary Examiner* — Robert Beausoliel, Jr.
*Assistant Examiner* — Arthur Ganger
(74) *Attorney, Agent, or Firm* — Cantor Colburn LLP; Maeve Carpenter

(57) ABSTRACT

Embodiments relate to generating application-processable commands from character strings. An aspect includes preparing a database in which are recorded keywords for presenting commands as conversion candidate objects, conversion candidate objects, and commands generated when a conversion candidate object has been selected. Another aspect includes receiving a plurality of character strings inputted by a user for an application. Another aspect includes converting a character string of the plurality of character strings to generate a completion candidate character string. Another aspect includes referencing the database when the character string includes a keyword, and presenting, to the user, completion candidate character strings and conversion candidate objects as a conversion candidate list. Another aspect includes generating a command corresponding to a selected conversion candidate (Continued)

object in response to selection of one of the conversion candidate objects from the conversion candidate list by the user.

15 Claims, 11 Drawing Sheets

(56) References Cited

U.S. PATENT DOCUMENTS

| | | | | |
|---|---|---|---|---|
| 6,232,985 | B1* | 5/2001 | Chase | G06T 11/60 345/441 |
| 8,326,859 | B2* | 12/2012 | Paek | G06Q 10/10 707/767 |
| 8,739,068 | B2* | 5/2014 | Albertson | G06F 3/0481 345/440 |
| 8,762,858 | B1* | 6/2014 | Tovino | H04L 51/046 715/708 |
| 2007/0226649 | A1* | 9/2007 | Agmon | G06F 17/276 715/816 |
| 2012/0041752 | A1* | 2/2012 | Wang | G06F 3/018 704/2 |
| 2012/0192096 | A1* | 7/2012 | Bowman | G06F 3/0481 715/780 |

FOREIGN PATENT DOCUMENTS

| | | |
|---|---|---|
| JP | 10301922 A | 11/1998 |
| JP | 1185736 A | 3/1999 |
| JP | 11345062 A | 12/1999 |
| JP | 2001043391 A | 2/2001 |
| JP | 2001142595 A | 5/2001 |
| JP | 2002207749 A | 7/2002 |
| JP | 2002351712 A | 12/2002 |
| JP | 2005526321 A | 9/2005 |
| JP | 2006262389 A | 9/2006 |
| JP | 2006527931 A | 12/2006 |
| JP | 2011192136 A | 9/2011 |
| WO | 2009001828 A1 | 12/2008 |

* cited by examiner

TEXT-BASED COMMAND GENERATION

PRIORITY

This application claims priority to Japanese Patent Application No. 2013-108686, filed May 23, 2013, and all the benefits accruing therefrom under 35 U.S.C. §119, the contents of which in its entirety are herein incorporated by reference.

BACKGROUND

The present disclosure relates generally to a command-generating method and, more specifically, to using text to generate commands.

In recent years, graphics editors and drawing tools have become command-rich, making it possible to perform finely honed operations. Menus have become more hierarchically organized as the number of functions has increased, and operations themselves have become increasingly multi-layered. In an environment with an abundance of commands, it is difficult to select the desired command and manipulate an object Methods have been adopted in which shortcuts are assigned to specific commands. However, the number of shortcuts is limited. Also, even when shortcuts are assigned, it is difficult for a user to remember a large number of shortcuts. Forcing the user to remember this many shortcuts and engage in complex mouse operations is hard on inexperienced users.

Input method editors (IME) are known that have functions (Suggest/Auto Complete/Contents Assist) for monitoring character strings inputted into an object and presenting an anticipated character string. They also have functions for converting inputted text into registered graphic strings such as pictograms and emoticons. A method has also been disclosed in Non-patent Literature 1 which is used to create graphic objects from handwritten inputs, but a method with exceptional usability for generating commands for objects has yet to be provided.

An object manipulating method of the prior art is described with reference to FIG. 1. Using a drawing tool 180, the user 190 enters text for an object, or generates, changes or deletes an object. The inputted character string 110 entered by the user 190 using a keyboard is usually transferred to an IME 185 to convert the character string or complete the character string to obtain a completion candidate character string 120. After a confirmation operation 130 has been performed, the candidate character string is inputted to the drawing tool 180 via the application programming interface (API) as a confirmed character string 140. When the user 190 manipulates an object using the drawing tool 180, an object is selected (150) using a pointing device such as a mouse, and the drawing tool 180 responds by displaying a dialog box showing selectable attributes (160). The user selects the desired attributes (170), and finally confirms the input by the drawing tool 180 of attributes for the object. In the method of the prior art, the input of text and the input of object attributes are completely separate. In other words, text is inputted using the keyboard, and object attributes are selected and confirmed using a pointer.

SUMMARY

A method, system, and computer program product for generating application-processable commands from character strings are provided. An aspect includes preparing a database in which are recorded keywords for presenting commands as conversion candidate objects, conversion candidate objects, and commands generated when a conversion candidate object has been selected. Another aspect includes receiving a plurality of character strings inputted by a user for an application. Another aspect includes converting a character string of the plurality of character strings to generate a completion candidate character string. Another aspect includes referencing the database when the character string includes a keyword, and presenting, to the user, completion candidate character strings and conversion candidate objects as a conversion candidate list. Another aspect includes generating a command corresponding to a selected conversion candidate object in response to selection of one of the conversion candidate objects from the conversion candidate list by the user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Embodiments disclosed herein relate to text-based command generation. A method for flexibly and properly selecting, or inputting, a desired command from among a group of various commands that can be accepted by an application is provided. User-inputted text is converted to generate or call a command.

Application-processable commands are generated from character strings by preparing a database in which are recorded keywords for presenting commands as conversion candidate objects, conversion candidate objects, and commands generated when a conversion candidate object has been selected; receiving character strings inputted by the user for an application; converting the character string to generate a completion candidate character string; referencing the database when the character string includes a keyword, and presenting to the user completion candidate character strings and conversion candidate objects as a conversion candidate list; and generating a command corresponding to a selected conversion candidate object in response to selection of one of the conversion candidate objects from the conversion candidate list by the user. A completion candidate character string may be generated by an IME or character string completion function. Also, the database may include icon information for the conversion candidate objects and parameters for the commands.

Embodiments can be used to generate (call) commands from text conversion. Graphic objects are listed as candidates in a conversion completion list of inputted character strings, and a command corresponding to the selected candidate is generated to change the attributes of the object.

Figure 1:
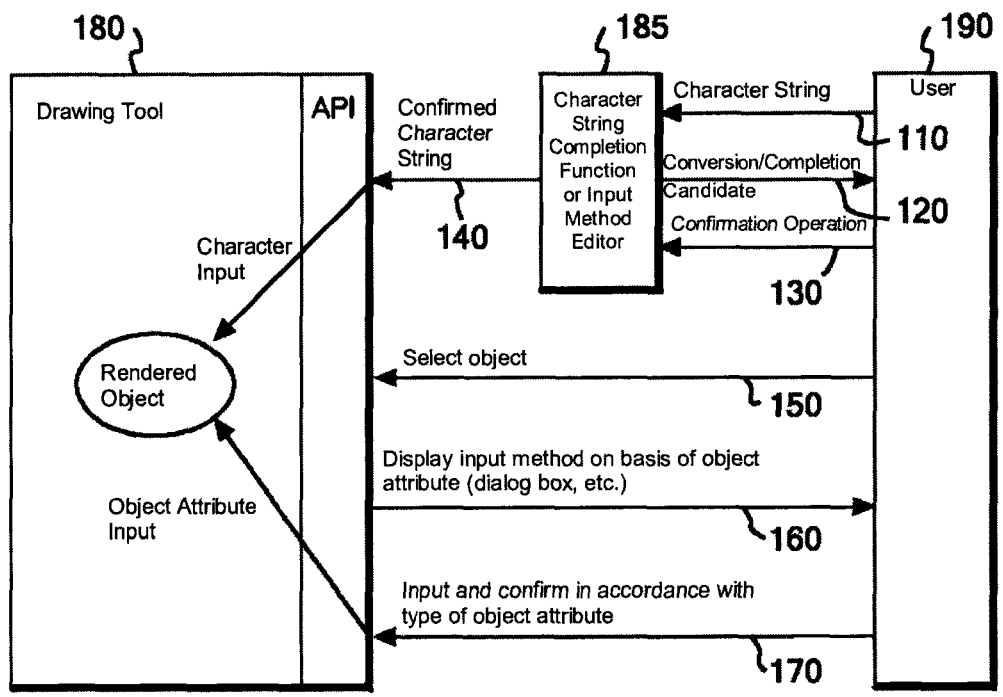
FIG. 1 illustrates an embodiment of object manipulation according to the prior art.
Figure 2:
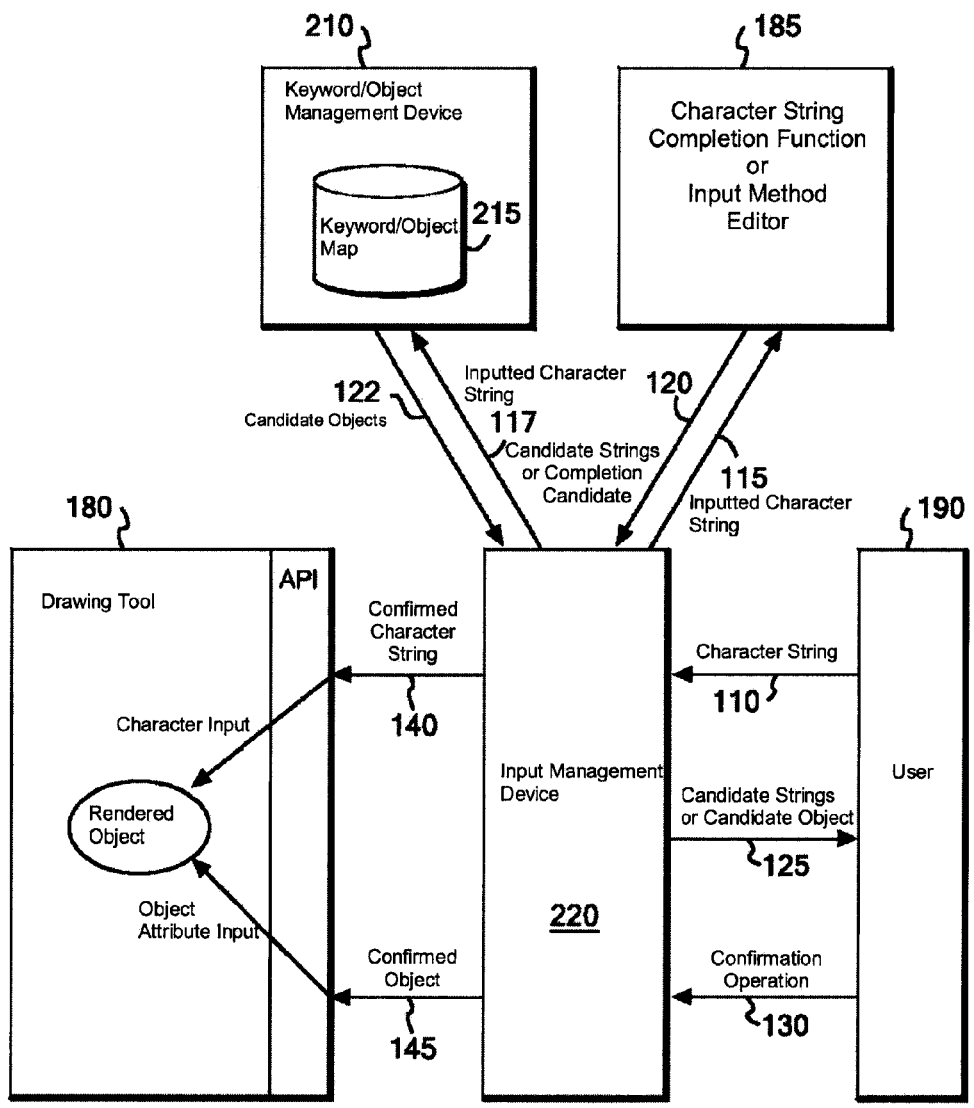
FIG. 2 illustrates an embodiment of text-based command generation.

FIG. 2 illustrates an embodiment of text-based command generation. FIG. 2 includes keyword/object management device 210, and an input management device 220 which receives and confirms inputted characters from the user and is also used to select and confirm object attributes. In FIG. 2, an inputted character string 110 entered by the user 190 using a keyboard is transferred (115) to the IME 185 via the input management device 220, and is also transferred (117) to the keyword/object management device 210. Converted character strings 120 and/or conversion candidate objects 122 are received from both the IME 185 and the keyword/object management device 210. FIG. 2 shows an example in which the IME is used. However, the IME 185 may be replaced by a character string completion function.

The input management device 220 combines these candidates and presents them to the user (125), and inputs the character string (140) or object (145) confirmed by the user performing a selection operation (130) to the drawing tool 180 via an API. The keyword/object management device 210 references a keyword/object map 215 using the inputted character string as a keyword, and transfers any object selected as a conversion candidate to the input management device 220.

In this configuration, the user can confirm a text string or graphic object by simply entering text and performing a conversion operation. In other words, when the attributes of an object have been changed, the user does not have to operate a pointing device or remember shortcut keys.

Figure 3:
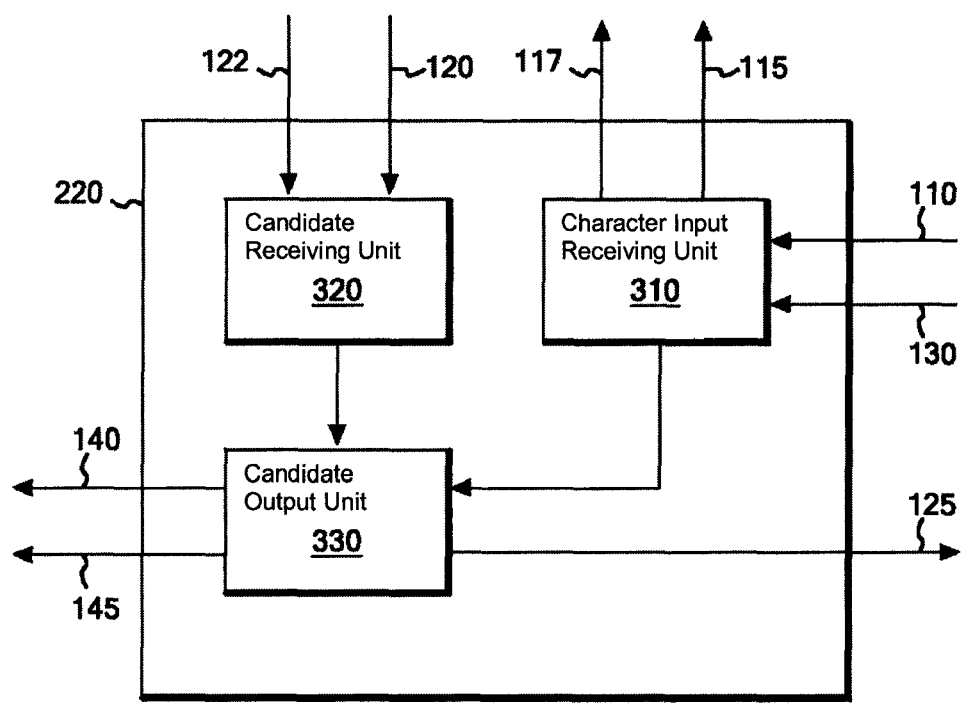
FIG. 3 illustrates a block diagram of an embodiment of an input management device.

A block diagram of the input management device 220 is shown in FIG. 3. An inputted character string 110 from the user is received by a character input receiving unit 310, and is transferred both to an IME 185 (or character string completion function) and to a keyword/object management device 210. The character input receiving unit 310 determines whether or not an inputted character is, for example, the return key for the confirmation operation 130. If a confirmation operation has been performed, information indicating which candidate was selected is sent to the candidate output unit 330.

The candidate receiving unit 320 receives conversion candidates 120 and/or conversion candidate objects 122 from the IME editor 185 and keyword/object management device 210, and sends them to the candidate output unit 330. The candidate output unit 330 merges the received candidates and presents them to the user (125). When a candidate from the character input receiving unit 310 has been selected, and the selected candidate is a character string, the character string is sent by the candidate output unit 330 to the drawing tool 180 as a confirmed character string 140.

When the selected candidate is an object, the corresponding object command 140 is generated and sent to the drawing tool 180.

Figure 4:
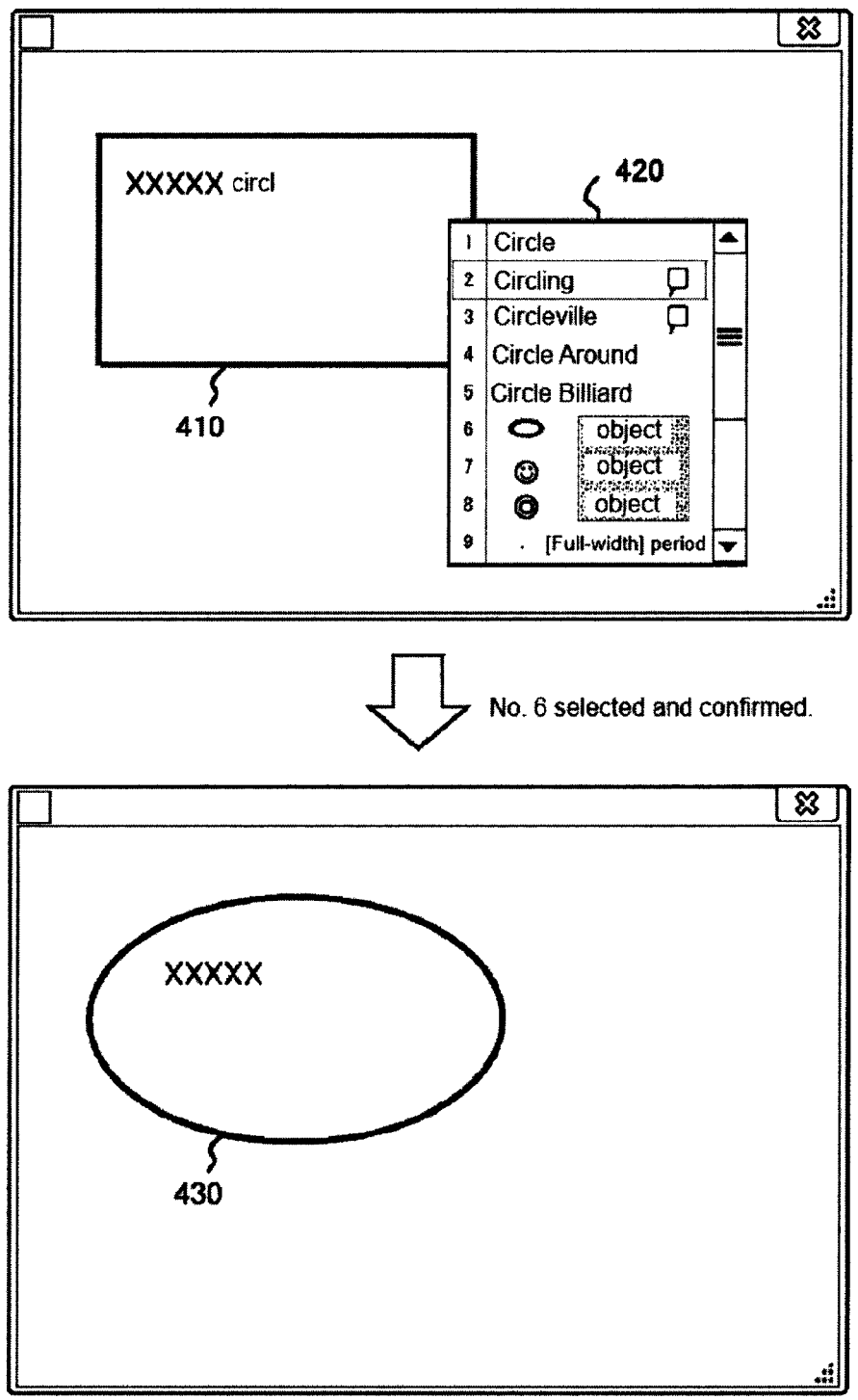
FIG. 4 illustrates an embodiment of an operation window.

FIG. 4 shows an embodiment of an operation window. The box object 410 is an object created beforehand using a drawing tool, a graphics editor or a graphics creating application. In the case of FIG. 4, a rectangular object is assumed. In FIG. 4, text is entered by the user in the object 410.

The "XXXXX" on this screen is text that has already been entered and confirmed. When the user continues this text by entering "circl", character string conversion candidates 1, 2, 3, 4, 5 and 9 from the IME 185 function or character string completion function are displayed along with conversion candidate objects 6, 7 and 8 in a conversion candidate panel 420. The conversion candidate objects included in the candidate conversion list for "circl" are an oval, a smiley face, and a donut. When the oval is selected by the user, the corresponding graphics command is generated for the box object 410, and the rectangular object 410 is converted into an oval-shaped object 430. In other words, the conversion candidate list presents character string conversion candidates as well as conversion candidate objects that can be selected, whereby graphics commands can be generated (called) by inputting text.

Figure 5:
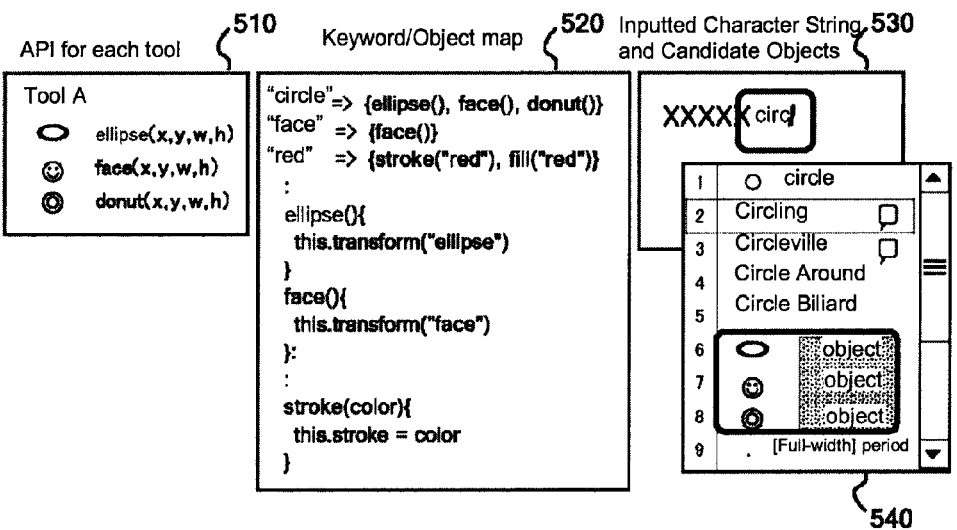
FIG. 5 is diagram illustrating embodiments of relationships between APIs, commands, and conversion candidates.

FIG. 5 is a diagram showing examples of relationship between APIs, commands and conversion candidates. In FIG. 5, drawing Tool A includes "ellipse", "face" and "donut" as APIs 510 corresponding to the character string "circl". The keyword/object management device 210 has a keyword/object map 520 for Tool A and an object conversion table 550 for Tool A. The keyword/object map 520 includes codes for calling the APIs for Tool A. The object conversion table 550 includes icon file names for the icons used to present object candidates, and parameters used when an API command is generated and called. In FIG. 5, the object conversion table is a separate file. However, this table may also be inserted into the keyword/object map.

The keyword/object management device 210 transfers command, parameter and icon information to the input management device 220 as a list of conversion candidate objects for the inputted character string 110. The list transferred from the keyword/object management device 210 to the input management device 220 via the candidate receiving unit 320 is merged with the other conversion candidate character strings shown in panels 530 and 540 and presented to the user by the candidate output unit 330.

When the user has selected and confirmed the selection of an object candidate 540, the candidate output unit 330 selects the corresponding command from the received list of conversion candidate objects, adds the parameters, and executes the command. When no parameter values have been indicated, predetermined values are used. Thus, an object command can be generated (called) from the selection of a text conversion candidate.

Figure 6:
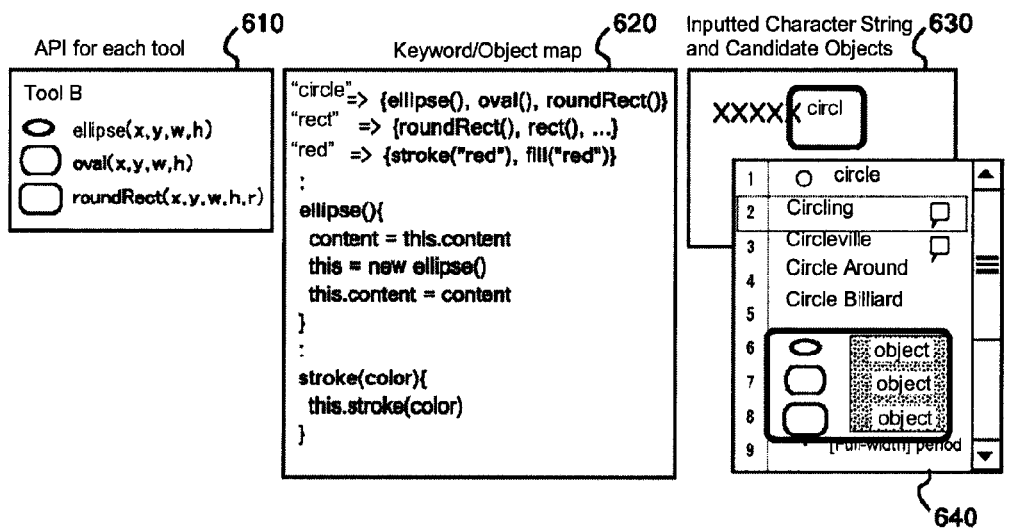
FIG. 6 illustrates an embodiment of a of drawing tool.

A keyword/object map is prepared for each drawing tool. In the example shown in FIG. 6, drawing Tool B includes "ellipse", "oval" and "roundRect" as APIs 610 corresponding to the keyword "circl". The keyword/object map 620 differs from that of drawing Tool A in FIG. 5 in that three descriptions "ellipse", "oval", "roundRect" are included in the candidate object list for the keyword "circl". Icon file names and parameters are also prepared in the object conversion table 650 for Tool B. The candidate output unit 330 merges these with other conversion candidate character strings, as shown in panels 630 and 640, and presents them to the user.

Figure 7:
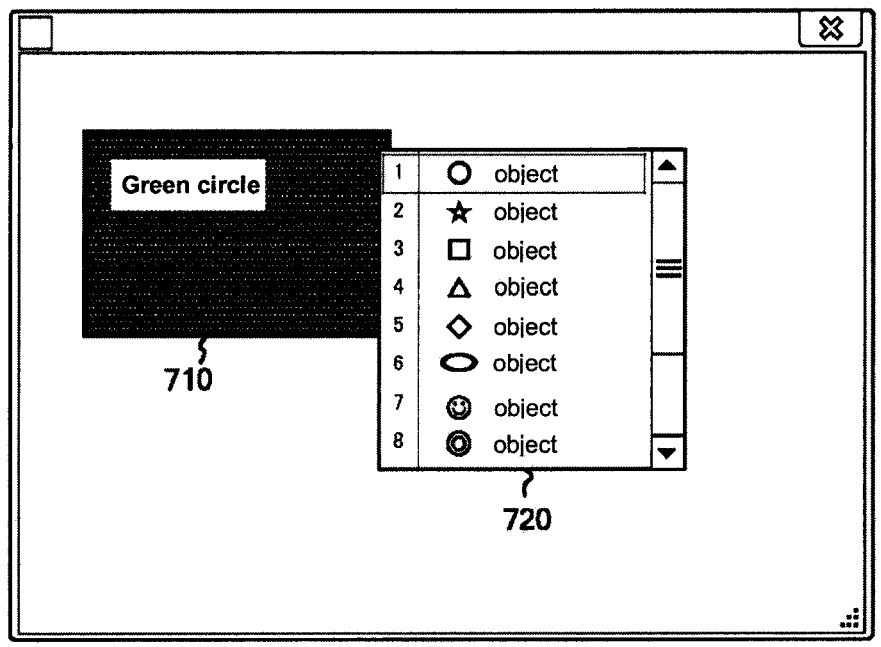
FIG. 7 illustrates an embodiment of text-based command generation.
Figure 7:
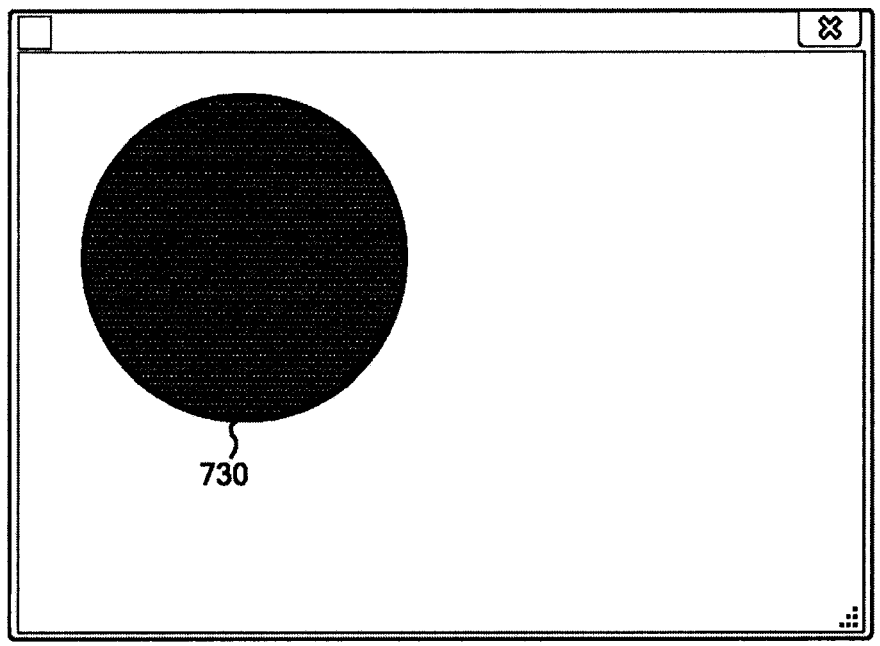

FIG. 7 shows another example text-based command generation. The box object 710 is an object created by the application beforehand. In FIG. 7, the user enters the text "green circle" in the object 710. Conversion object candidates 1-8 for the inputted character string are displayed in panel 720. When the user selects No. 1, the application responds by converting the rectangular box object 710 into a round, green object 730.

In this way, many different types of graphics commands can be given to an application by adding many different conversion candidates to the conversion codes and conversion table. For example, different colors and line types can be generated and selected as conversion candidates. Moreover, graphics objects can be created and shared as conversion candidates via a network such as the internet.

Figure 8:
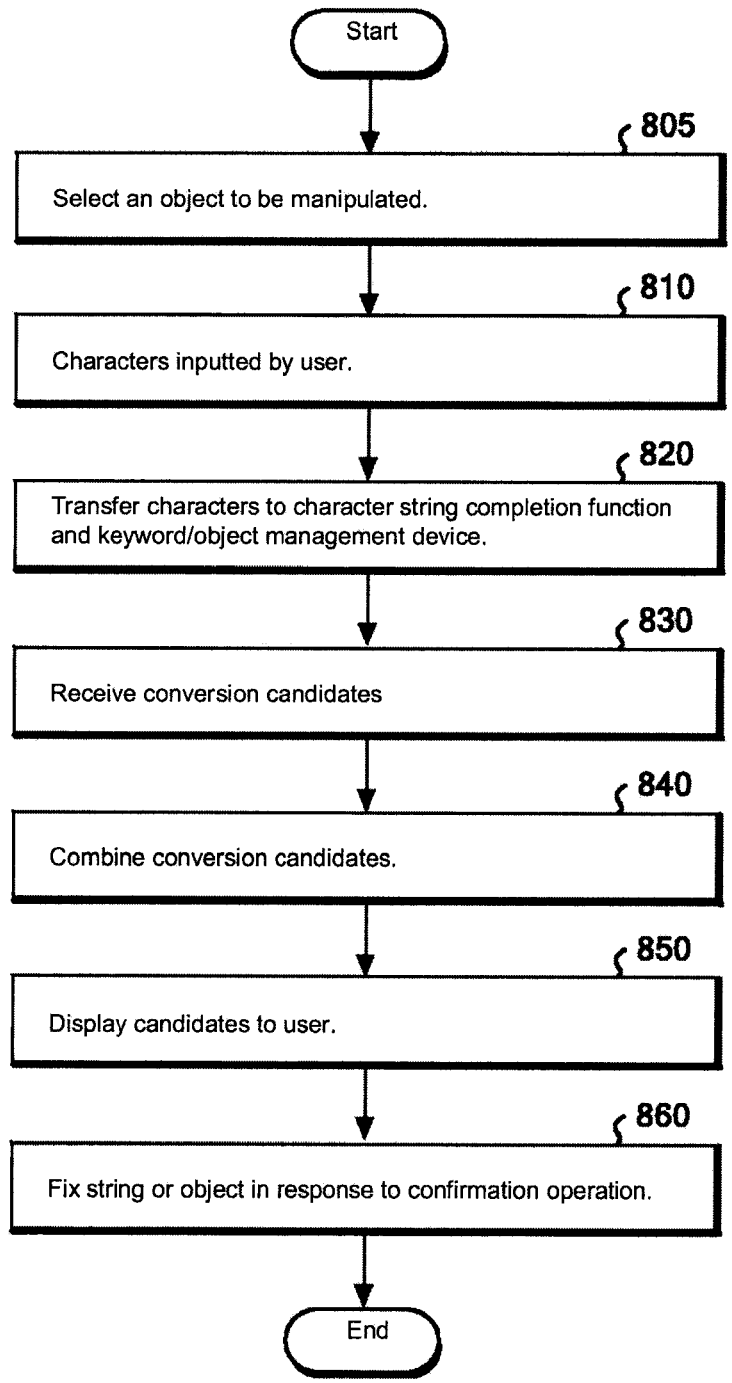
FIG. 8 is a flowchart an embodiment of a method for text-based command generation.

FIG. 8 is a flowchart of an embodiment of text-based command generation. First, in block 805, an object to be manipulated is selected. Next, in block 810, the process waits for the user to enter characters. In block 820, the inputted character string is transferred to the IME and the keyword/object management device 210. In block 830, conversion candidates generated by the IME and the keyword/object management device 210 are received. Next, the candidates are combined in block 840, and presented to the user in block 850. Finally, in block 860, a character string or object is confirmed by the user via a confirmation operation.

Figure 9:
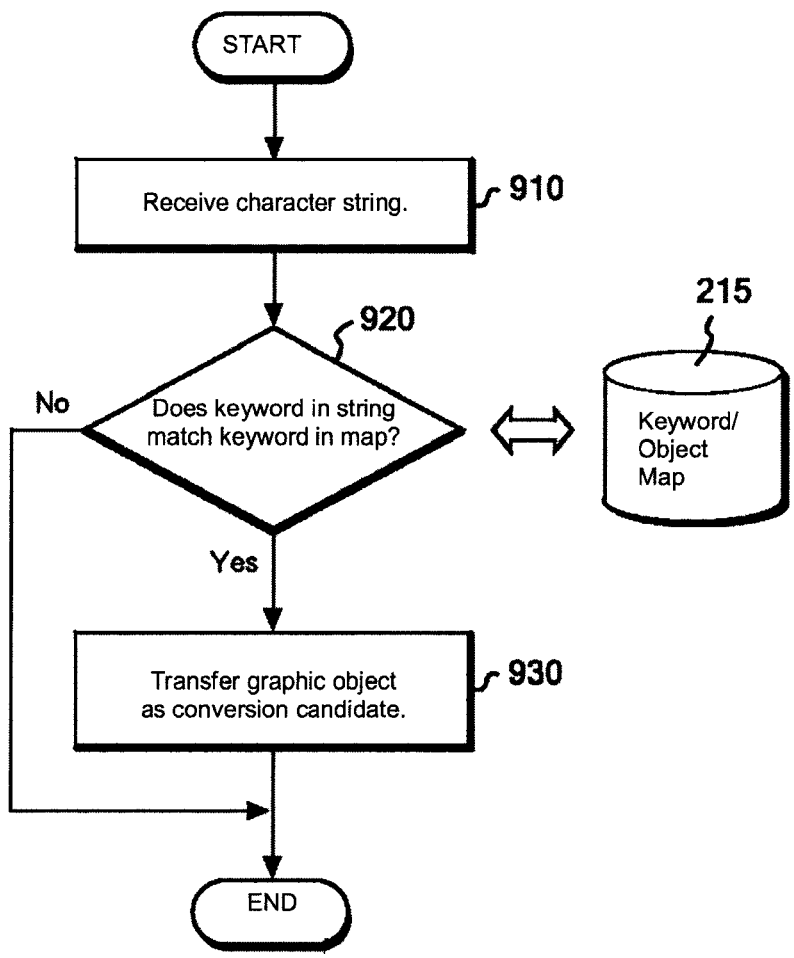
FIG. 9 is a flowchart an embodiment of operations performed by a keyword/object management device.

FIG. 9 is a flowchart of operations performed by the keyword/object management device 210. First, in block 910, a character string is received from the character input receiving unit 310. Next, in block 920, it is determined whether or not the received character string is a keyword in the keyword object map 215. If not, the process is ended. If so, in block 930, a list of graphics objects including icon information and graphics commands is transferred as conversion candidates for the keyword to the candidate receiving unit 320.

Figure 10:
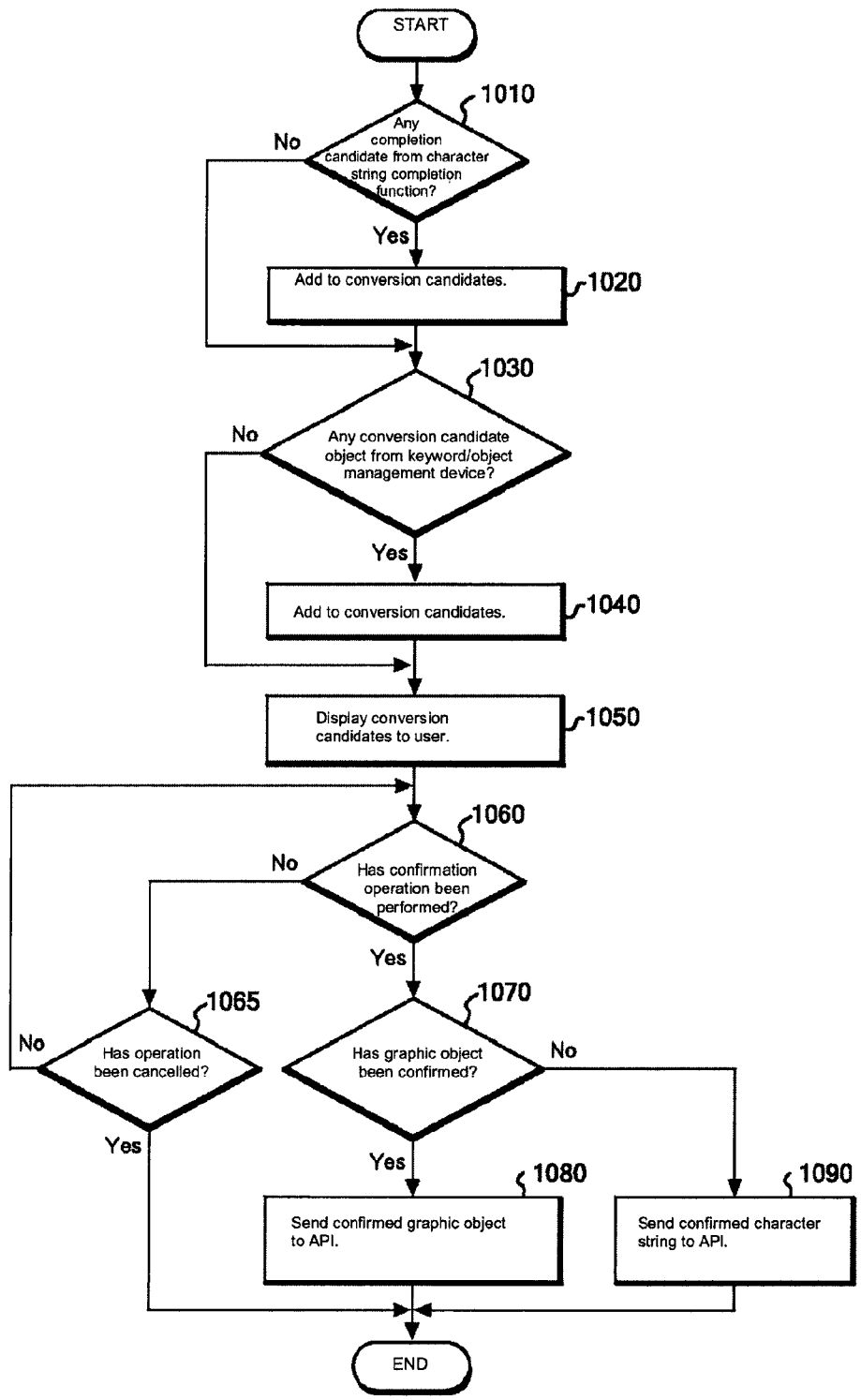
FIG. 10 is a flowchart an embodiment of a method for text-based command generation.

FIG. 10 is a flowchart showing blocks 830 through 860 of FIG. 8 in greater detail. In block 1010, it is determined whether or not there are any completion candidate character strings from the IME. If so, they are added in block 1020 to the conversion candidates. In block 1030, it is determined whether or not there are any conversion candidate objects from the keyword/object management device 210. If so, they are added in block 1040 to the conversion candidates. The combined conversion candidates are then presented to the user by the candidate output unit 330 in block 1050.

Next, in block 1060, it is determined whether or not the user has confirmed any of the candidates. If not, it is determined in block 1065 whether or not the operation is cancelled. If cancelled, the process is ended. If not cancelled, the process returns to block 1060. If a candidate has been confirmed in block 1060, it is determined in block 1070 whether or not the confirmed candidate is a graphics object. If the confirmed candidate is a graphics object, the corresponding graphics command is generated and executed by the application. If not, the character string confirmed in block 1090 is sent to the application.

Figure 11:
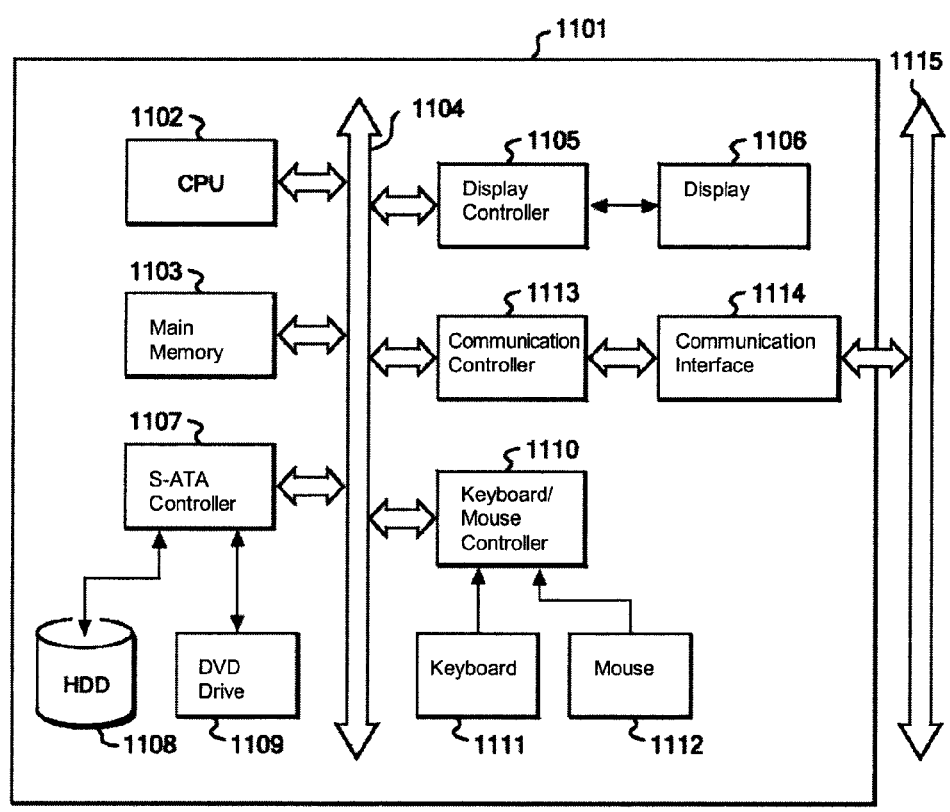
FIG. 11 is a block diagram of an example of computer hardware used by embodiments of text-based command generation.

FIG. 11 is a block diagram of an example of computer hardware used in conjunction with embodiments of text-based command generation. A computer apparatus (1101) according to an embodiment includes a central processing unit (CPU) (1102) and a main memory (1103), and these are connected to a bus (1104). The CPU (1102) may be any appropriate computer processor, and may be based on, for example, a 32-bit or 64-bit architecture.

A display (1106), such as an liquid crystal display (LCD) monitor, is connected to the bus (1104) via a display controller (1105). A display (1106) is used to display not only the OS, graphics applications, and the drawing tools, but also panels showing lists of conversion candidate character strings and graphic objects. When the display (1106) includes a touch panel function, signal processing is performed on information inputted using the touch panel. When the display does not include this function, signal processing is performed on information inputted via a keyboard (1111) and a mouse controller (1112).

A hard disk or silicon disk (1108) and a compact disk read only memory (CD-ROM), digital video disk (DVD) drive or Blu-ray drive (1109) are also connected via a storage device controller (1107) to the bus (1104).

The hard disk (1108) is used to store the program for a keyword/object management device 210 which includes a keyword/object map 215, the program for the input management device 220, a program for performing IME or completion functions, and the operating system (OS). The programs and data including the conversion table are loaded into the main memory (1103) from the hard disk (1108) and executed by the CPU (1102).

A keyboard (1111) and mouse (1112) are connected to the bus (1104) via a keyboard/mouse controller (1110), and are used when the user performs the selecting operation and confirmation operation on character strings in the input candidate selection panel.

Various embodiments can be realized by a device-executable program written in any appropriate computer programming language, including but not limited to an object-oriented programming language such as C++, Perl or Ruby, or a database language such as SQL. This program can be stored on a computer-readable recording medium and distributed, or transmitted and distributed.

The present invention was explained using specific embodiments and examples, but the present invention is not limited to these specific embodiments and examples. The present invention can be altered in any way conceivable by a person of skill in the art, including other embodiments, additions, modifications, and deletions. Any mode or aspect realizing the actions and effects of the present invention is within the scope of the present invention.

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

What is claimed is:

1. A computer-implemented method for generating application-processable commands from character strings, the method comprising:
provided a database storing conversion candidate objects, a keyword/object map that specifies a correspondence between keywords and the conversion candidate objects, and commands generated for one or more conversion candidate objects that have been selected;
receiving a plurality of character strings inputted by a user for an application;
converting a character string of the plurality of character strings to generate a completion candidate character string;
determining that the character string includes a keyword;
referencing the keyword/object map stored in the database to determine a plurality of conversion candidate objects corresponding to the keyword, the keyword being representative of a type of graphical object, the plurality of conversion candidate objects comprising a first candidate conversion object and a second candidate conversion object associated with one or more common attributes of the type of graphical object, the first candidate conversion object being further associated with a first attribute and the second candidate conversion object being further associated with a second attribute, the first attribute being representative of a first variation of the type of graphical object and the second attribute being representative of a second variation of the type of graphical object, the first variation and the second variation being mutually exclusive;
presenting, to the user, the completion candidate character string and the plurality of conversion candidate objects as a conversion candidate list;
receiving, from the user, a selection of the first conversion candidate object;
generating a command corresponding to the selected first conversion candidate object; and
executing the command to alter one or more graphical attributes of a rendered graphical object to the one or more common attributes and the first attribute associated with the first variation of the type of graphical object based at least in part on the selected first conversion candidate object.

2. The method according to claim 1, wherein the completion candidate character string is generated by an input method editor (IME).

3. The method according to claim 1, wherein the completion candidate character string is generated by a character string completion function.

4. The method according to claim 1, wherein the database further stores icon information for the conversion candidate objects and parameters for the commands.

5. The method according to claim 1, wherein the database further stores parameters for the commands.

6. A system for generating application-processable commands from character strings, the system comprising:
at least one processor; and
at least one memory storing computer-executable instructions and a database, the database storing conversion candidate objects, a keyword/object map that specifies a correspondence between keywords and the conversion candidate objects, and commands generated for one or more conversion candidate objects that have been selected,
wherein the at least one processor is configured to access the at least one memory and execute the computer-executable instructions to:
receive a plurality of character strings inputted by a user for an application;
convert a character string of the plurality of character strings to generate a completion candidate character string;
determine that the character string includes a keyword;
reference the keyword/object map stored in the database to determine a plurality of conversion candidate objects corresponding to the keyword, the keyword being representative of a type of graphical object, the plurality of conversion candidate objects comprising a first candidate conversion object and a second candidate conversion object associated with one or more common attributes of the type of graphical object, the first candidate conversion object being further associated with a first attribute and the second candidate conversion object being further associated with a second attribute, the first attribute being representative of a first variation of the type of graphical object and the second attribute being representative of a second variation of the type of graphical object, the first variation and the second variation being mutually exclusive;

present, to the user, the completion candidate character string and the plurality of conversion candidate objects as a conversion candidate list;

receive, from the user, a selection of the first conversion candidate object;

generate a command corresponding to the selected first conversion candidate object; and execute the command to alter one or more graphical attributes of a rendered graphical object to the one or more common attributes and the first attribute associated with the first variation of the type of graphical object based at least in part on the selected first conversion candidate object.

7. The system according to claim 6, wherein the completion candidate character string is generated by an input method editor (IME).

8. The system according to claim 6, wherein the completion candidate character string is generated by a character string completion function.

9. The system according to claim 6, wherein the database further stores icon information for the conversion candidate objects and parameters for the commands.

10. The system according to claim 6, wherein the database further stores parameters for the commands.

11. A computer program product for generating application-processable commands from character strings, the computer program product comprising a non-transitory computer readable medium having computer-readable program code embodied therewith, which when executed by a computer processor, causes the computer processor to implement a method comprising:

providing a database storing conversion candidate objects, a keyword/object map that specifies a correspondence between keywords and the conversion candidate objects, and commands generated for one or more conversion candidate objects that have been selected;

receiving a plurality of character strings inputted by a user for an application;

converting a character string of the plurality of character strings to generate a completion candidate character string;

determining that the character string includes a keyword;

referencing the keyword/object map stored in the database to determine a plurality of conversion candidate objects corresponding to the keyword, the keyword being representative of a type of graphical object, the plurality of conversion candidate objects comprising a first candidate conversion object and a second candidate conversion object associated with one or more common attributes of the type of graphical object, the first candidate conversion object being further associated with a first attribute and the second candidate conversion object being further associated with a second attribute, the first attribute being representative of a first variation of the type of graphical object and the second attribute being representative of a second variation of the type of graphical object, the first variation and the second variation being mutually exclusive;

presenting, to the user, the completion candidate character string and the plurality of conversion candidate objects as a conversion candidate list;

receiving, from the user, a selection of the first conversion candidate object;

generating a command corresponding to the selected first conversion candidate object; and executing the command to alter one or more graphical attributes of a rendered graphical object to the one or more common attributes and the first attribute associated with the first variation of the type of graphical object based at least in part on the selected first conversion candidate object.

12. The computer program product according to claim 11, wherein the completion candidate character string is generated by an input method editor (IME).

13. The computer program product according to claim 11, wherein the completion candidate character string is generated by a character string completion function.

14. The computer program product according to claim 11, wherein the database further stores icon information for the conversion candidate objects and parameters for the commands.

15. The computer program product according to claim 11, wherein the database further stores parameters for the commands.

* * * * *